Nov. 5, 1935.  E. T. BRACE  2,019,949
EGG TRAY RACK
Filed April 15, 1932
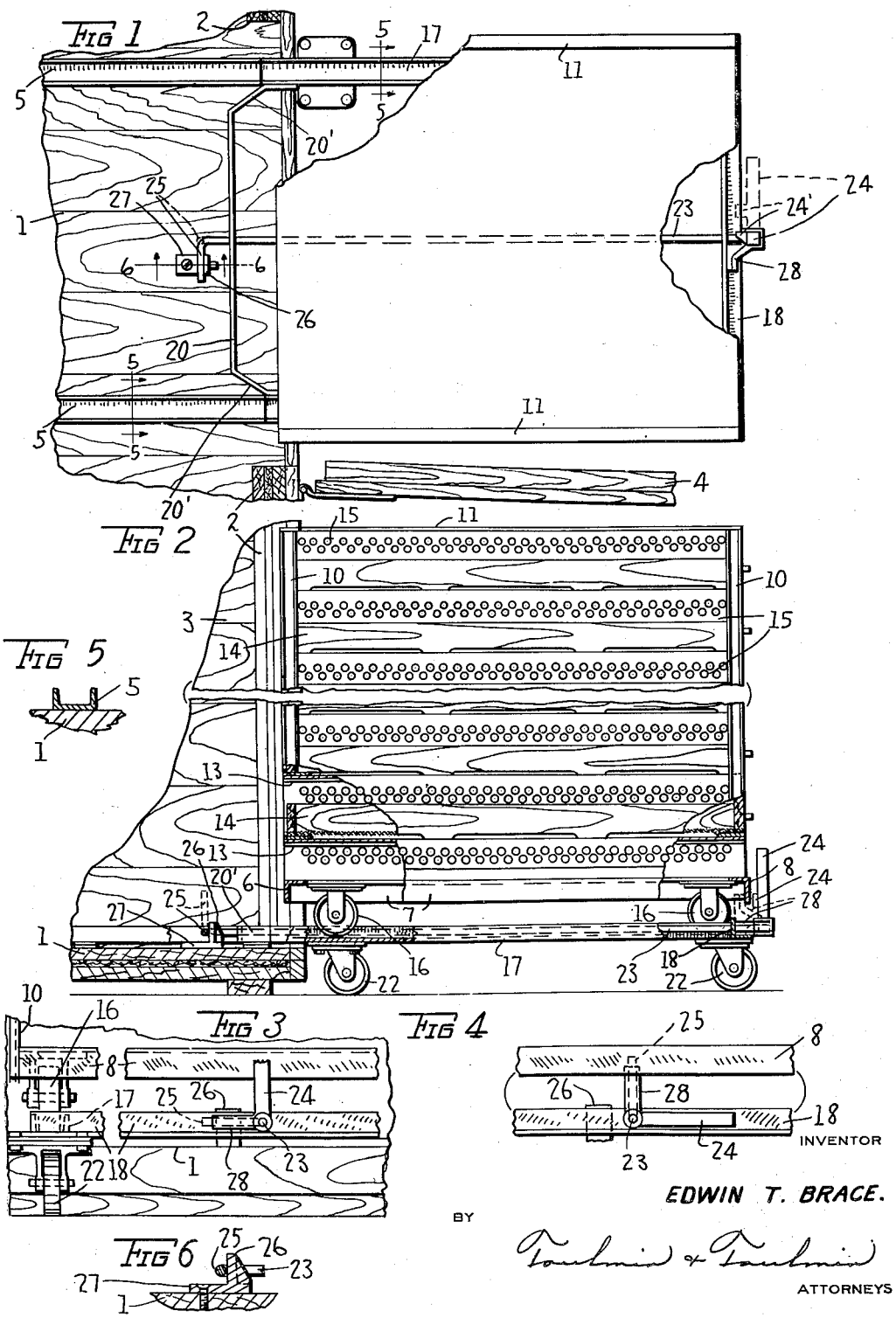
INVENTOR
EDWIN T. BRACE.
BY
ATTORNEYS Patented Nov. 5, 1935

2,019,949

UNITED STATES PATENT OFFICE 2,019,949

EGG TRAY RACK

Edwin T. Brace, Springfield, Ohio, assignor to The Buckeye Incubator Manufacturing Company, Springfield, Ohio, a corporation of Ohio Application April 15, 1932, Serial No. 605,477

7 Claims. (Cl. 105—373)

This invention relates to devices for removing egg trays from and returning the same to hatchers and incubators.

One of the objects of this invention is to provide simple and effective means for removing an egg tray rack loaded with trays from an incubator or hatcher and for also readily replacing the same therein after the chicks have been removed from the trays and the trays supplied with fresh eggs in the case of an incubator or with eggs at the beginning of the period of hatching in the case of a hatcher.

It is the object of my invention to provide the combination of an enclosure having a guiding track, a tray carrying truck movable on said track, and a transferring truck having trackways adapted to interlock with the trackways in the enclosure and to receive the tray carrying truck.

It is a further object to provide a common locking actuating and locking means carried on the track truck which supports the tray truck to first lock the track truck to the enclosure to align the tracks on the track truck with the enclosure tracks while the tray truck is being moved from one position to the other; and thereafter upon unlocking the track truck from the enclosure to lock the tray truck on the track truck so that they can travel together.

A further and more specific object is to provide a truck for a wheeled tray rack, and to equip the truck and floor of the incubator or hatcher with rails in a way that the rails of both the truck of the incubator or hatcher may be readily brought into alignment so that the tray rack may be readily and easily moved from the truck into the incubator or hatcher or vice versa.

A further and more specific object of the invention is to provide means whereby the tray rack may be locked into position on the truck and the truck locked to the incubator or hatcher, with common means for simultaneously operating both locks to unlock the tray rack from the truck and lock the truck to the incubator or hatcher or vice versa.

Further objects of the invention will appear from the accompanying description and statement of advantages.

In the accompanying drawing:

Figure 1 is a top plan view partly broken away and shown in section of a tray rack mounted upon a truck and of a portion of an incubator or hatcher in connection with which the truck is used.

Figure 2 is a view partly in side elevation and partly in vertical section of parts shown in Figure 1.

Figure 3 is an enlarged end view of a portion of the tray rack and truck illustrating the locking devices.

Figure 4 is a view similar to Figure 3 but showing the locking devices in a different position.

Figure 5 is an enlarged vertical section on the lines 5—5 of Figure 1, of one of the track and truck rails.

Figure 6 is an enlarged fragmentary vertical section on the line 6—6 of Figure 1.

Referring to the drawing in detail, 1 represents a portion of the floor, 2 a portion of a front wall and 3 a portion of one of the side walls of an enclosure forming a hatcher or an incubator. That part of the structure shown has a doorway adapted to be closed by a door, a portion 4 of which is shown. The floor of this structure is equipped with a pair of rails 5 preferably of channel form as indicated in Figure 5. These rails extend to a point adjacent the doorway.

The tray rack is one of usual construction, 6 representing the lower front rail, 7 the lower side rails and 8 the lower rear rail, all preferably made of angle-iron. The rack frame further has vertical members 10 having their upper ends connected by cross members 11 and is also further connected together by strips of angle iron 13 which form supports upon which the trays 14 are slidably mounted in the usual way. The sides of the tray frame are also provided with perforated sheet metal members 15 to permit a circulation of air over and through the trays. This tray rack is equipped with wheels 16 which permit it to be wheeled into and out of the enclosure.

The tray rack when in the incubator rests upon the rails 5 and when it is desired to remove the rack from the enclosure, it is pushed along the rails 5 and onto a truck which is equipped with similar channel rails 17. This truck consists of a suitable frame formed by the aforesaid rails 17, a rear rail 18 of angle iron suitably connected to the rails 17, and a front flat metal bar 20 having its ends secured to rails 17 and bent to provide inclined surfaces 20' at each end thereof; these inclined surfaces being for the purpose of aligning the rails 17 with the rails 5 by contacting the rails 5, thereby guiding the truck to its proper location in the doorway. The truck is provided with castor wheels 22 which will permit it to be readily turned in any direction so that it is readily steered to proper position by the inclined surfaces 20'.

The rails 17 of the truck project forwardly of the front castor wheels a sufficient distance to overlap the edge of the floor 1 at the doorway and abut the ends of the rails 5 and the bottoms of these rails 17 are of a height to just clear the floor as shown in Figure 2.

In order to lock the truck in the position in which the rails 5 and 17 abut, there is provided on the truck frame a rod 23 which is loosely mounted in the frame parts 18 and 20 and has its rear end provided with an operating handle 24 and its forward end with a latch portion 25 bent at right-angles thereto. When the truck frame is positioned as shown in the drawing, this rod is rotated by an attendant to bring the latch portion 25 thereof on the rear side of an upstanding lug 26 which is formed on a plate 27 secured to the floor of an incubator or hatcher.

In order to lock the tray rack upon the truck when the rack is to be transported away from the enclosure, there is secured to the handle 24 a latch member 28 which stands at approximately right angles to the handle. When the rod is rotated one-quarter turn to release the latch member 25 from the lug 26 the latch 28 being extended radially from the rod 23 in the same direction as the latch 25 is brought in front of the rack frame member 8. When the rack is wheeled upon the truck, the rear castor wheels 16 are positioned closely adjacent the vertical leg of the cross member 18 so that when the latch 28 is in locking position, as in Figure 4, the rack will be held from movement upon the truck. In unlocking the truck, after it has been properly positioned to bring its rails in registry with the rails 5, the operator merely rotates the rod 23 one-quarter revolution which releases the latch 28 from the crossbar 8 and also engages the latch member 25 with the lug 26, as seen in full lines in Figures 1, 2 and 3, so that the two operations of locking or releasing the rack and releasing or locking the truck are performed simultaneously by the same device.

In order to impart the proper oscillatory movement to the rod 23 to perform its function without any particular care upon the part of the operator, the operating handle 24 is provided with a lug 24' which engages with the horizontal leg of the rear truck frame member 18 in the truck unlocking position, while the latch 28 itself limits the movement of the handle in the opposite direction by contact with the horizontal leg of the frame member 18.

I desire to comprehend within my invention such modifications as may be clearly embraced within the claim and scope of my invention.

Having thus fully described my invention, what I claim as new and desire to secure by Letters Patent, is:

1. In a truck for conveying wheeled egg tray racks to and from an enclosure, the combination of a pair of rails for the wheels of said rack carried by said truck, a latch carried by the truck to lock the rack against movement on said rails, and a second latch operatively connected to the first-named latch also carried by said truck to lock the truck against movement with relation to the enclosure when loading or unloading.

2. In a truck for conveying wheeled egg tray racks to and from an enclosure, the combination of a pair of rails for the wheels of said rack carried by said truck, a latch carried by the truck to lock the rack against movement on said rails, a second latch also carried by said truck to lock the truck against movement with relation to the enclosure when loading or unloading, and means for simultaneously operating said latches to lock the truck and release the rack or vice versa.

3. In a truck for conveying wheeled egg tray racks to and from an enclosure, the combination of a pair of rails for the wheels of said rack carried by said truck, a longitudinally extending rod rotatably mounted on the truck, and a pair of latch bars projecting from said rod, one latch to lock the rack on the truck and the other latch to lock the truck to the enclosure, together with means for rotating said rod to alternately release one latch and engage the other.

4. In a truck for conveying wheeled egg tray racks to and from an enclosure, the combination of a pair of rails for the wheels of said rack carried by said truck, a longitudinally extending rod rotatably mounted on the truck, and a pair of latch bars projecting in the same direction from said rod, one latch to lock the rack on the truck and the other latch to lock the truck to the enclosure, and a handle connected to the first named latch and to the said rod to rotate the same, said handle and latch being formed to engage the frame of the truck by one-quarter revolution of the same in either direction.

5. In combination, a pair of stationary tracks, a pair of portable tracks, a tray carrying truck movable on said tracks from one to the other, and simultaneously operated means carried by the portable tracks to lock said portable tracks to the stationary tracks and the truck on the portable tracks.

6. In combination in an enclosure having stationary tracks, a tray carrying truck mounted therein, a track carrying truck adapted to receive the tray carrying truck, means to align said tracks to permit the passage of the tray carrying truck from one set of tracks to the other, a locking means to lock the track truck and its tracks to the tracks in the enclosure, and means to unlock said locking means and at the same time lock the tray truck to the tracks on the track truck.

7. In combination, a plurality of tracks supported above a floor, a plurality of similar tracks pivotally supported on the floor at the same level as the first mentioned tracks, and a tray truck adapted to move from one set of tracks to another on the same level, and means on the movable tracks for first locking the movable tracks to the first mentioned tracks while the tray truck is proceeding onto the movable tracks which at that time are held stationary, and thereafter locking the tray truck on the movable tracks and unlocking the movable tracks from the first mentioned tracks so that the movable tracks and tray truck may move together as a unit.

EDWIN T. BRACE.